July 26, 1960
T. R. BAXTER
2,946,166
POULTRY PACKAGING MACHINE AND METHOD
Filed July 5, 1956
3 Sheets-Sheet 1
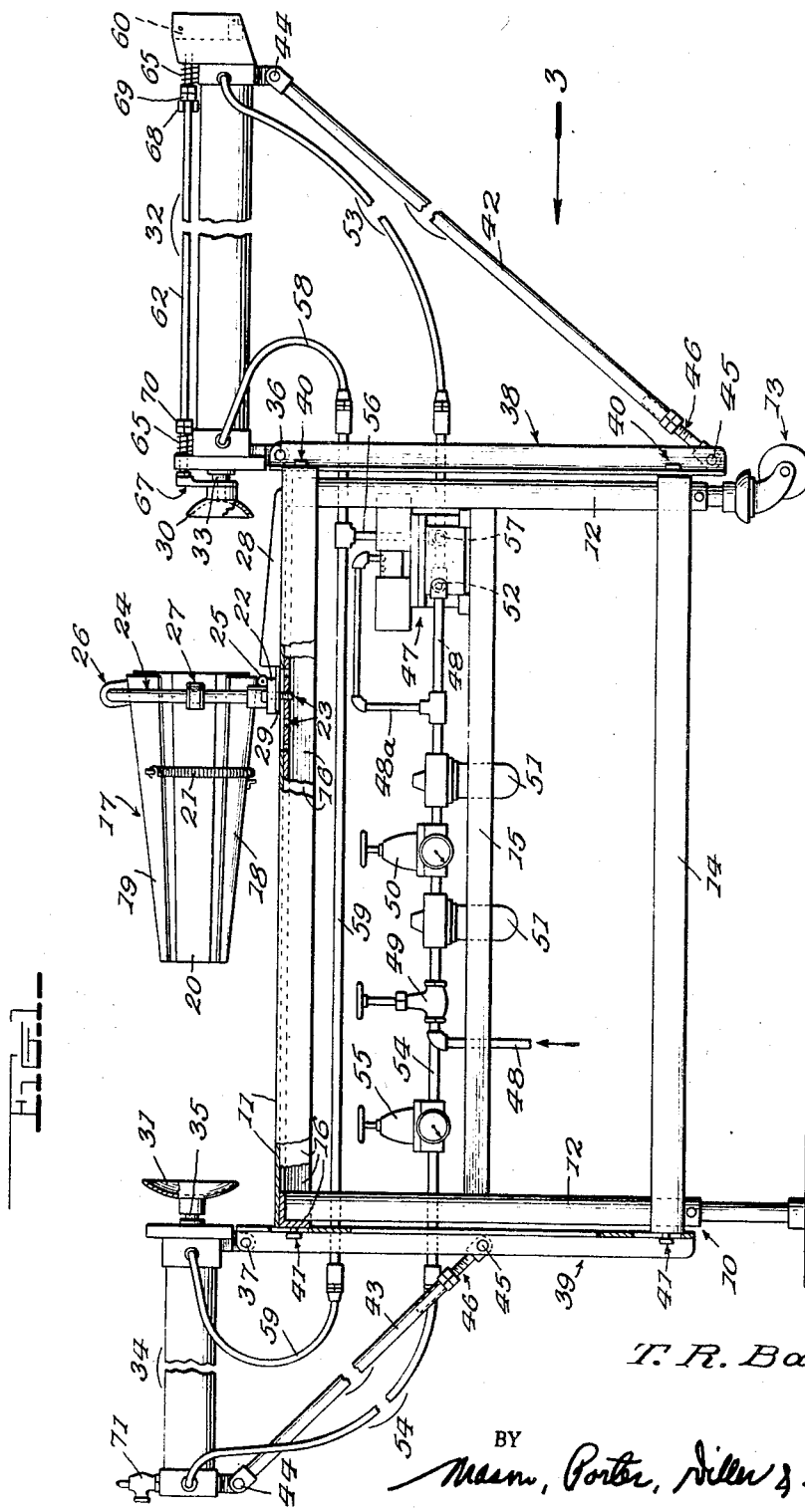
INVENTOR
T. R. Baxter
BY
Mason, Porter, Diller & Stewart
ATTORNEYS July 26, 1960  T. R. BAXTER  2,946,166
POULTRY PACKAGING MACHINE AND METHOD
Filed July 5, 1956  3 Sheets-Sheet 2
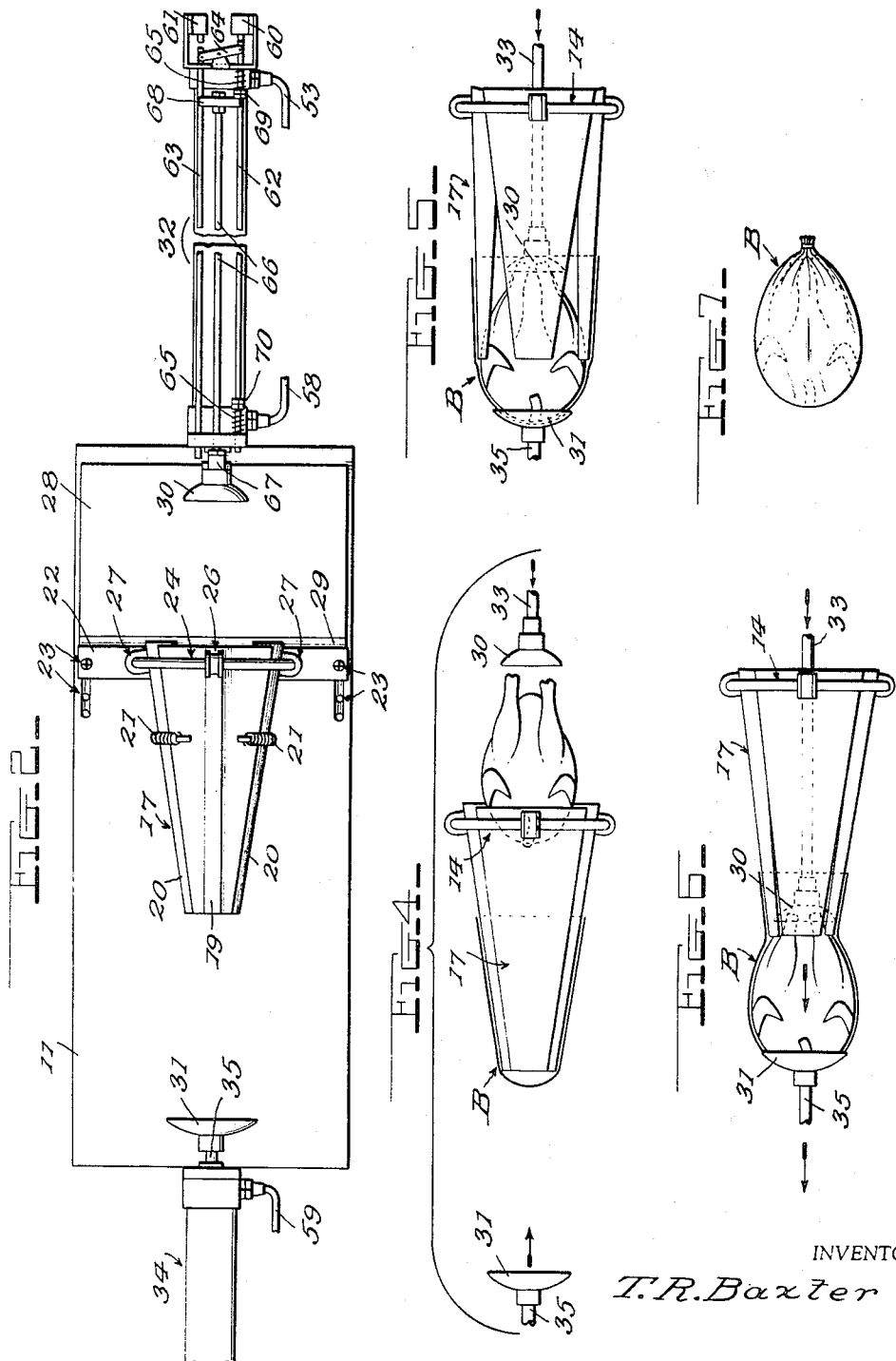
INVENTOR
T. R. Baxter
BY
Mason, Porter, Diller & Stewart
ATTORNEYS

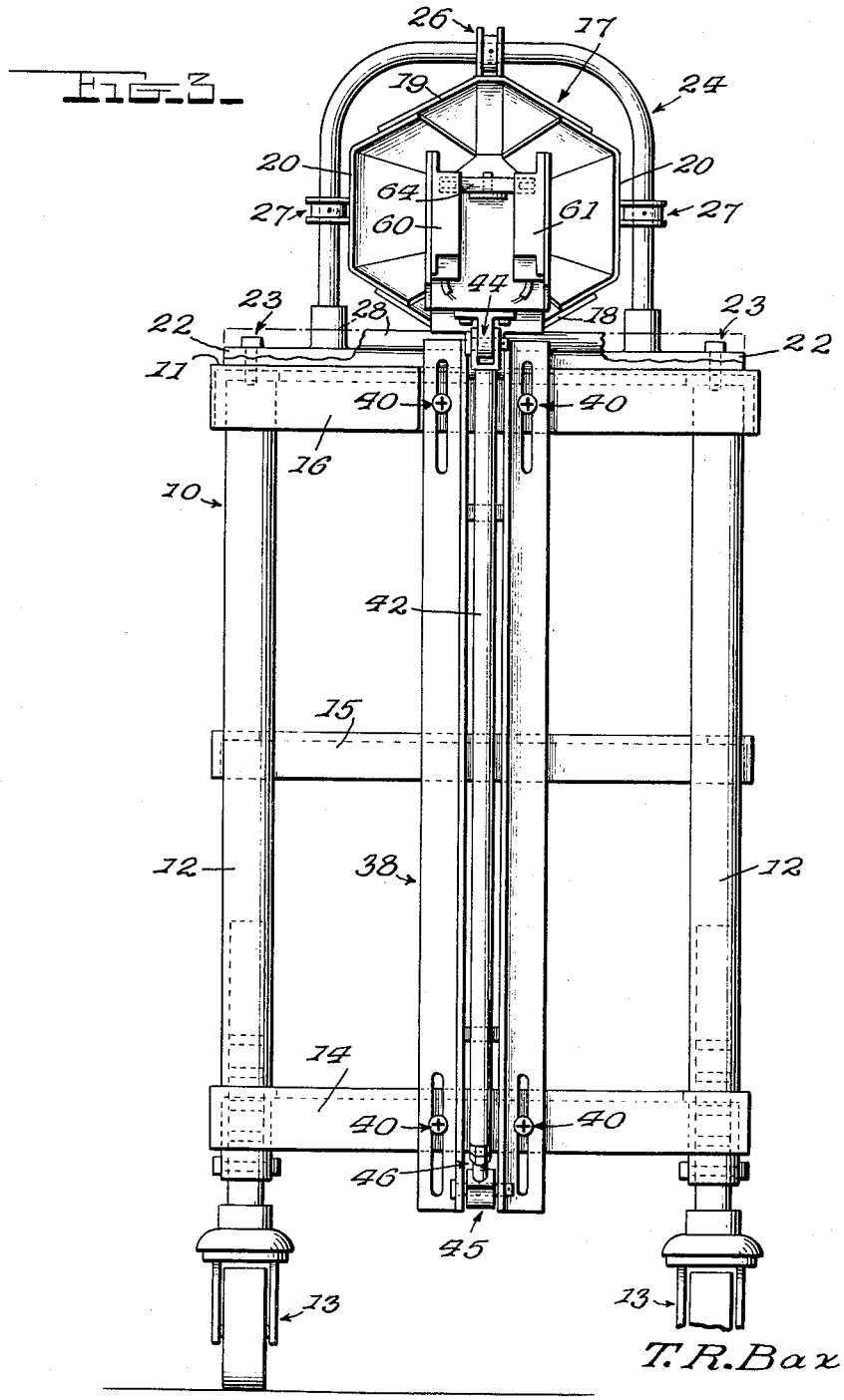

United States Patent Office 2,946,166
Patented July 26, 1960

2,946,166

POULTRY PACKAGING MACHINE AND METHOD

Thomas R. Baxter, Mount Vernon, Ohio, assignor to Continental Can Company, Inc., New York, N.Y., a corporation of New York Filed July 5, 1956, Ser. No. 595,941

5 Claims. (Cl. 53—124)

In preparing dressed poultry for the market, it has become quite customary to package the fowls individually in transparent plastic bags, to not only protect them but to attractively display them for sale. Experience has taught that the relatively short chunky birds such as some of the Cornish game crosses, when so packaged, present an appearance which is generally preferred by customers: and this reacts rather unfavorably against the longer and less chunky birds, even though their quality and taste may equal or excel those of their rivals. The present invention aims to overcome this inequity.

One object of the invention is to provide a novel poultry packaging method in which the normal appearance of ordinary fowls is altered to that preferred by purchasers, by longitudinally compressing the fowls into relatively short chunky form, and tightly packaging each fowl while in this shortened chunky form to maintain said form whether the fowls are to be frozen or merely refrigerated.

Another object is to provide a novel poultry bagging method in which a dressed fowl is inserted into an expanded elastic bag and longitudinally compressed during insertion into the desired chunky form, and in which release of the bag from its expanded condition insures that it will tightly contract around the fowl to expel excess air.

A further object is to provide a novel poultry bagging method embodying the steps of placing an elastic bag around an expansible horn; forcing a dressed fowl longitudinally through said horn to (1) expand said horn and bag, (2) place the fowl in the expanded bag and against the bag bottom, and (3) gradually move the bag from the horn for tight contraction around the fowl; yieldably resisting the movement of the fowl and bag by pressure against the bag bottom, to cause longitudinal compression of the fowl into shortened chunky form; and securing the bag in closed position while the fowl is in said shortened chunky form.

A still further object is to provide a novel machine for conveniently and rapidly performing the method, said machine comprising a support, a hollow tapered expansible horn mounted on said support and of a size to be expanded by forcing of a fowl therethrough, said horn being adapted for reception in an elastic bag to expand the latter when said horn 's expanded, a fowl pusher mounted on said support for movement into the larger end of said horn to push a dressed fowl through said horn into the elastic bag and gradually move the bag from said horn for tight contraction around the fowl, means connected with said pusher for advancing and retracting the same, and a yieldable abutment mounted on said support in the path along which the fowl is pushed from said horn by said pusher, said yieldable abutment being positioned to abut the bag bottom and providing sufficient resistance to insure longitudinal compression of the fowl into shortened chunky form as the fowl is moved by said pusher.

Another object is to provide one cylinder-and-piston-assembly for advancing and retracting the fowl pusher, to provide a second cylinder-and-piston assembly for advancing the abutment from a retracted position to an operative position against the bag bottom, and to provide valve means for controlling the conduction of fluid pressure to said assemblies in such manner that said abutment may yieldably resist movement of the fowl by said pusher, to effect the desired compression of said fowl into relatively short chunky form without danger of excessive compression.

Yet another object is to provide a novel machine which may be automatically operated, except for the placing of the fowls at the entrance of the horn and the removal of the bagged fowls, said placing and removal being performed by hand.

Still another object is to provide an expansible sectional, sleeve-like horn, the sections of which are mounted in a novel manner.

With the above and other objects in view that will hereinafter appear, the nature of the invention will be more clearly understood by reference to the following detailed description, the appended claims and the several views illustrated in the accompanying drawings.

In the drawings:

Figure 1 of the accompanying drawings is a side elevation of the machine, partly in section.

Figure 2 is a top plan view.

Figure 3 is an end view as indicated by the arrow 3 of Figure 1.

Figures 4, 5 and 6 are diagrammatic top views illustrating method steps.

Figure 7 is a top view showing a bagged fowl.

The machine disclosed includes an elongated stand 10 having a table top 11. The stand legs 12 are preferably of vertically extensible and retractable form and the legs at one end of the stand are shown as having casters 13. The legs 12 are rigidly connected by a lower frame 14, an intermediate frame 15, and an upper frame 16, the table top 11 being secured upon said upper frame.

A hollow, tapered, expansible, sleeve-like horn 17 is mounted over the table top 11 and is composed of a bottom section 18, a top section 19, and two side sections 20. The sections 18, 19 and 20 are all pivotally mounted at the larger rear end of the horn and are yieldably held in forwardly converging relation by a suitable spring 21. The horn is sufficiently long to extend from the bag mouth to the bag bottom, as seen in Figure 4. Thus when a fowl is being forced through the horn and thus expands said horn, the entire bag side wall and the bag bottom will be stretched.

A transverse bar 22 extends under the rear end of the horn 17 and is adjustably mounted by suitable means 23 for adjustment longitudinally of the table top 11. This bar 22 rigidly supports an arched frame 24 which straddles the rear end of the horn 17. The bottom horn section 18 is pivotally mounted at 25 on the bar 22; the top section 19 is pivotally mounted at 26 on the crown of the arched frame 24, and the side section 20 are pivotally mounted at 27 on the legs of said arched frame 24. The horn 17, frame 24 and bar 22 are thus unitarily connected for adjustment to desired position with respect to the table top 11.

A ramp 28, upon which to rest a fowl to be bagged, rests upon the table top 11 and is preferably connected at 29 with the bar 22 for adjustment unitarily with the latter and the horn 17.

A pusher 30 is provided behind the horn 17 for pushing a fowl through this horn into an elastic, plastic bag B stretched around the horn 17 (Figure 4) and for gradually moving this bag from said horn (Figures 5 and 6) for tight contraction around the fowl. A yieldable abutment 31 is provided in advance of the horn 17 for resisting the movement of the fowl by exerting yielding pressure against the bag bottom (Figures 5 and 6), the pressure being sufficient to cause longitudinal compression of the fowl into the desired shortened chubby form (compare Figures 4 and 6).

One cylinder and piston assembly 32 is provided for operating the pusher 30, the latter being directly carried by the piston rod 33 of said assembly 32. A second cylinder and piston assembly 34 is provided for operating the the abutment 31 and this abutment is directly carried by the piston rod 35 of said second assembly 34.

The inner ends of the assemblies 32 and 35 are pivoted at 36 and 37, respectively, the upper ends of two vertically elongated frames 38 and 39, said frames being mounted at 40 and 41 on the ends of the stand 12 for vertical adjustment. The outer ends of the assemblies 32 and 34 are connected by inclined struts 42 and 43 with the lower ends of the frames 38 and 39, respectively. These struts are pivoted at their upper and lower ends as seen at 44 and 45, respectively, and each strut has suitable means 46 permitting strut extension and contraction. By vertically adjusting the frames 38 and 39 and extending or retracting the struts 42 and 43, the cylinder and piston assemblies 32 and 34 may be set at the most advantageous positions.

Compressed air is utilized for operating the assemblies 32 and 34, and a compressed air actuated, electrically controlled, control valve 47 (Figure 1) is employed for controlling the admission of the compressed air to and the exhaust of air from said assemblies. This valve is of known construction which forms no part of the present invention. A compressed air supply line 48 leads to the valve 47 and is provided with a cut-off valve 49 and a pressure regulating valve 50. This line 48 is also preferably provided with conventional means 51 for removing any foreign matter from the compressed air. The line 48 is branched at 48a to supply compressed air for operating the valve 47.

A compressed air line is connected at 52 with the control valve 47 and includes two branches 53 and 54 connected with the outer ends of the cylinder and piston assemblies 32 and 34, respectively. The branch 54 has a pressure regulating valve 55 so set that the air pressure supplied to the assembly 34 will be considerably less than that supplied to the assembly 32.

Another compressed air line 56 is connected at 57 with the control valve 47. This line 56 has two branches 58 and 59 connected to the inner ends of the cylinder and piston assemblies 32 and 34 respectively.

The control valve 47 is operable to simultaneously admit compressed air to the outer ends of both assemblies 32 and 34 to cause inward movement of the pusher 30 and the abutment 31 (see Figure 4) and said control valve 47 then acts to exhaust pressure from the inner ends of said assemblies 32 and 34. Similarly, the control valve is operable to simultaneously admit compressed air to the inner ends of the assemblies 32 and 34 to retract the pusher 30 and abutment 31, and said control valve then effects exhausting of air pressure from the outer ends of said assemblies.

A controlling switch 60 is provided for the valve 47, to operate the latter and cause admission of compressed air into the outer ends of the cylinder and piston assemblies 32 and 34. A second switch 61 is provided to cause operation of the valve 47 to admit compressed air into the inner ends of the assemblies 32 and 34. The operation of both switches 60 and 61 is automatic in the present disclosure and thus the proceeding and receding movements of the pusher 30 and abutment 31 are automatic, the speed of movement, however, being sufficiently slow to permit removal of a bagged fowl from the table 11, placing of another bag B on the horn 17 and placing of another fowl on the ramp 28, before the pusher and abutment again proceed after retraction.

In the present disclosure, both valves 60 and 61 are of self-opening form, and two longitudinally slidable rods 62 and 63 (Figures 1 and 2) are provided for closing said valves, respectively. These rods are slidably mounted upon the assembly 32 and are connected by a lever 64 for movement in opposite directions. Springs 65 are associated with the rod 62 to yieldably hold both rods 62 and 63 in neutral position when permitted to do so, both switches 60 and 61 being then open.

A central operating rod 66 is connected at 67 with the piston rod 33 of the assembly 32 for movement bodily with said piston rod 33. The rod 66 has a cross arm 68 slidably engaging the rods 62 and 63. Rod 62 has one abutment 69 to be struck by the cross arm 68 when the pusher 30 reaches fully retracted position as seen in Figure 2, thereby so shifting the rods 62 and 63 as to close switch 60 and allow switch 61 to remain open. Rod 62 also has another abutment 70 to be struck by cross arm 68 when the pusher 30 reaches fully extended position, thereby causing such shifting of the rods 62 and 63 as to close switch 61 and permit switch 60 to remain open.

Closing of the switch 60 causes operation of the control valve 47 to effect proceeding movements of the pusher 30 and abutment 31 (see Figure 4). Closing of switch 61 causes operation of the control valve 47 to cause return of both the pusher 30 and abutment 31. In either instance, as soon as the cross arm 68 has moved away from the previously shifted abutment 69 or 70 on rod 62, this rod returns to its neutral position under the influence of the springs 65 and the previously closed switch 60 or 61 then reopens. Thus, neither controlling circuit for the valve 47 remains closed except momentarily when actually needed.

In the operation of the machine to perform the method, an elastic bag B is stretched around the horn 17 and a fowl is placed on the ramp 28 and partly in said horn (Figure 4). The cylinder and piston assemblies 32 and 33 are then operated to move the pusher 30 and abutment 31 toward each other. The pusher 30 forces the fowl through the horn 17, thereby expanding the latter and the elastic bag B. The fowl pushes against the bag bottom and the abutment 31 yieldably resists the movement of the fowl sufficiently to cause longitudinal compression of the latter into relatively short chubby form (see Figure 5). It will be recalled that the pressure supplied to the cylinder and piston assembly 34 is less than that supplied to the assembly 32. Thus, while the abutment 31 resists the movement of the fowl, the higher pressure in assembly 32 overcomes the lower in assembly 34 and hence said abutment 31 will be forced back as the pusher 30 and the fowl proceed, (see Figure 6). During this movement, the air in the assembly 34 becomes more highly compressed but increase of pressure to such a degree as to cause excessive compression of the fowl is prevented by providing said assembly 34 with a pressure relief valve 71 (Figure 1).

As the fowl is forced through the horn 17, it gradually forces the elastic bag B from said horn and said bag thus progressively contracts tightly around the fowl, driving out excess air from the bag. When the bag is forced completely from the horn, the pusher 30 and abutment 31 reverse and return to retracted position and the next cycle of operation occurs with only sufficient lapse of time to permit removal of the bagged fowl, placing another bag on the horn and placing another fowl on the ramp 28.

While each bagged fowl is in its shortened chubby form, the bag is tightly closed around the fowl and suitably secured in closed position, thereby maintaining the fowl in its altered form whether it is to be frozen or merely refrigerated.

It will be seen from the foregoing that novel provision has been made for attaining the desired ends, both as to method and machine. However, it is to be understood that variations may well be made within the scope of the invention.

I claim:
1. A poultry bagging machine comprising a support, a hollow tapered expansible horn mounted on said support and of a size to be expanded by forcing of a fowl therethrough, said horn being adapted for reception in an elastic bag and being of a length to extend from the bag mouth to the bag bottom to stretch the entire bag side wall and the bag bottom when said horn is expanded, a fowl pusher mounted on said support for movement into the larger end of said horn to push a dressed fowl through said horn into the elastic bag and gradually move the bag from said horn for tight contraction around the fowl, means connected with said pusher for advancing and retracting the same, and a yieldable abutment mounted on said support in the path along which the fowl is pushed from said horn by said pusher, said yieldable abutment being positioned to abut the bag bottom and remain in engagement with the bag until the fowl clears said horn while providing sufficient resistance to insure longitudinal compression of the fowl into shortened chunky form as the fowl is moved through said horn by said pusher and the bag progressively grips the fowl.

2. A poultry bagging machine comprising a support, a hollow tapered expansible horn mounted on said support and of a size to be expanded by forcing of a fowl therethrough, said horn being adapted for reception in an elastic bag and being of a length to extend from the bag mouth to the bag bottom to stretch the entire bag side wall and the bag bottom when said horn is expanded, a fowl pusher at the larger end of said horn for pushing a dressed fowl through said horn into the elastic bag and gradually moving the bag from said horn for tight contraction around the fowl, an abutment at the smaller end of said horn in the path along which the fowl is moved from said horn by said pusher, said abutment being positioned to abut the bag bottom, one cylinder and piston assembly mounted on said support and having a piston rod connected to said pusher, a second cylinder and piston assembly mounted on said support and having a piston rod connected to said abutment to facilitate movement of said abutment away from said horn a distance at least sufficient for the removal of the packaged fowl from said horn smaller end, and valved means for conducting fluid pressure simultaneously to the inner ends of said assemblies to retract said pusher and said abutment from said horn and for conducting fluid pressure simultaneously to the outer ends of said assemblies to move said pusher into said horn and to move said abutment toward said horn, said valved means including means for conducting greater fluid pressure to said one cylinder and piston assembly than to said second cylinder and piston assembly; whereby said abutment will yieldably resist the movement of a fowl from said horn under the influence of said pusher but will travel with the fowl and increase the fluid pressure in said second cylinder and piston assembly, the opposing pressures on said pusher and abutment being effective to cause longitudinal compression of the fowl to shortened chunky form.

3. In a poultry bagging machine having a horn; a pusher for forcing a dressed fowl through said horn into a bag, an abutment for yieldably resisting the movement of the fowl from said horn, and two cylinder and piston assemblies having piston rods connected to said pusher and abutment respectively; a table having a top above which said horn is mounted in horizontal cantilever relation, two vertically elongated frames at the ends of said table respectively, means connecting said frames with said table and permitting vertical adjustment of said frames, means mounting the inner ends of said cylinder and piston assemblies on the upper ends of said frames respectively with said pusher and said abutment being spaced above said table top and aligned with said horn, and inclined struts connecting the outer ends of said assemblies with the lower ends of said frames respectively.

4. A structure as specified in claim 3: said assemblies being pivotally mounted on said frames for vertical swinging movement, said struts being of extensible and retractable construction.

5. In a machine for longitudinally compressing a dressed fowl, stretching an elastic fowl-receiving bag and inserting the compressed fowl into the stretched bag; a supporting structure having a support upon which to place the fowl by hand, a sleeve-like longitudinally tapered expansible horn around which to initially stretch the elastic bag by hand, said horn being of a length to extend from the bag mouth to the bag bottom to stretch the entire bag wall and the bag bottom when said horn is expanded, means mounting said expansible horn on said supporting structure with the larger end of the horn in position to receive the fowl placed on said support, the entire internal surface of said horn being unobstructed for contact with the fowl as the latter is forced through the horn, means mounted on said supporting structure for forcing the fowl through the horn and against the bag bottom to expand said horn and stretch the entire bag side wall and the bag bottom as the fowl is received in the bag and to force the stretched fowl-containing bag from the horn, and means yieldably mounted on said supporting structure to abut the bag bottom and so resist the joint movement of the bag and fowl as to cause longitudinal compression of the fowl at the time the fowl is exiting from said horn and until the fowl passes out of said horn, whereby the fowl is retained in a compressed state until the bag has collapsed thereabout.

References Cited in the file of this patent
UNITED STATES PATENTS

| | | |
|---|---|---|
| 1,450,104 | Merli et al. | Mar. 27, 1923 |
| 1,611,268 | Colby | Dec. 21, 1926 |
| 2,048,447 | Hewitt | July 21, 1936 |
| 2,174,924 | McCleary | Oct. 3, 1939 |
| 2,348,144 | Opie | May 2, 1944 |
| 2,561,853 | Glow et al. | July 24, 1951 |
| 2,597,364 | Nash | May 20, 1952 |
| 2,608,331 | Hoffman | Aug. 26, 1952 |
| 2,633,280 | Davies | Mar. 31, 1953 |
| 2,673,016 | Gerbe | Mar. 23, 1954 |
| 2,685,394 | Rabinowitz | Aug. 3, 1954 |
| 2,685,996 | Shoffner et al. | Aug. 10, 1954 |
| 2,713,449 | Carmichael | July 19, 1955 |
| 2,751,731 | Evers | June 26, 1956 |
| 2,770,084 | Ruderman | Nov. 13, 1956 |